US008348197B2

(12) United States Patent
Lobo Barros et al.

(10) Patent No.: US 8,348,197 B2
(45) Date of Patent: Jan. 8, 2013

(54) INTEGRATION SYSTEM FOR LIFTING SURFACE LATERAL PARTS IN AN AIRCRAFT

(75) Inventors: Abel Lobo Barros, Madrid (ES); Jesús Vicente Bajo González, Madrid (ES); José Luis Lozano García, Madrid (ES); Antonio Francisco Pintor Archilla, Madrid (ES); Jesús Rodrígues Bodas, Madrid (ES)

(73) Assignee: Airbus Operations, SL, Getafe (Madrid) (ES)

( * ) Notice: Subject to any disclaimer, the term of this patent is extended or adjusted under 35 U.S.C. 154(b) by 802 days.

(21) Appl. No.: 12/318,794

(22) Filed: Jan. 8, 2009

(65) Prior Publication Data
US 2010/0108810 A1 May 6, 2010

(30) Foreign Application Priority Data

Oct. 30, 2008 (ES) .................................. 200803082

(51) Int. Cl.
*B64C 3/18* (2006.01)
(52) U.S. Cl. ................. 244/123.7; 244/123.4; 244/123.1
(58) Field of Classification Search ............... 244/123.1, 244/123.4, 123.7, 123.14, 124
See application file for complete search history.

(56) References Cited

U.S. PATENT DOCUMENTS

| 1,388,543 | A | 8/1921 | Barling |
| 2,116,953 | A | 5/1938 | Sambraus |
| 2004/0011927 | A1 | 1/2004 | Christman et al. |
| 2008/0283675 | A1* | 11/2008 | Zuniga Sagredo .......... 244/35 R |
| 2009/0001218 | A1* | 1/2009 | Munoz Lopez et al. ...... 244/124 |

FOREIGN PATENT DOCUMENTS
GB 192966 2/1923

* cited by examiner

*Primary Examiner* — J. Woodrow Eldred
(74) *Attorney, Agent, or Firm* — Wenderoth, Lind & Ponack, LLP.

(57) ABSTRACT

The lifting surfaces comprise a torsion box capable of bearing aerodynamic and inertial loads. The torsion box has lateral parts that are connected together by an attachment comprising a rib, having a central upper part and a central support lower part joined only by angled cross bars, forming a truss structure along the length of the central support upper part and the central support lower part. The angled cross bars are attached to the upper and the lower parts of the central support: alternatively to both sides of a plane of symmetry defined by said upper and lower parts of the central support, dividing the torsion box in the two lateral parts making a zone of access perpendicular to the length of the central supports, where said zone of access is closed with a piece provided with at least one hole for permanent access.

6 Claims, 6 Drawing Sheets

INTEGRATION SYSTEM FOR LIFTING SURFACE LATERAL PARTS IN AN AIRCRAFT

OBJECT OF THE INVENTION

As stated in the title of this descriptive specification, the present invention relates to an integration system for lifting surfaces lateral parts in aircrafts, the aim of which consists of providing a new system of attachment of the lateral parts of the torsion boxes in the plane of symmetry of the lifting surfaces of airplanes or aircrafts. This is a design solution allowing the assembly of the lateral parts without any need to make inspection holes for accessibility in certain linings.

The invention comes within the technical sector of aeronautics, and specifically to the assembly of the lateral parts making up a lifting surface in airplanes or aircrafts; being the basic aim of the invention to reduce the amount of inspection holes necessary for assembly, maintenance and revision operations.

By means of the invention, problems of accessibility in the final integration of the lateral parts of the torsion boxes are solved, maintaining the structural efficiency of the array and simplifying the design, manufacture and assembly of components, with the consequent final saving in economic resources.

BACKGROUND OF THE INVENTION

The structural core of a design of lifting surfaces comprises a torsion box capable of bearing the aerodynamic and inertial loads that it is subject to. The lifting surfaces are typically designed by means of two lateral parts joined in their plane of symmetry, as in the case of horizontal stabilizers, or two lateral parts and a third central part joining them, as in wings or horizontal stabilizers. A separate case is structures formed from a single box, such as ailerons, flaps, rudders, elevators and vertical stabilizers. The final assembly of lifting surfaces requires the necessary inspection holes (windows, openings or orifices) for adequate access to the attachment zones. Said inspection holes imply an appreciable reduction in the structural efficiency of the zones in their vicinity. This, in turn, implies an increase in weight with respect to an ideal structural configuration.

The attachment of lateral parts is usually done by means of a rib as a whole in its plane of symmetry. This type of installation is possible if the design considers the following aspects:

The lifting surface is provided with fuel tank, which entails access holes (manholes or handholes) in the lower part of the lining in order to carry out assembly/maintenance tasks. Access is also guaranteed with the support of inspection holes in spars or with removable spars. From the viewpoint of the design, manufacture and assembly, each inspection hole or the capacity to dismantle an element implies a major complication. Moreover, each inspection hole implies an increase in the weight of the structure.

The size of the lifting surface is sufficiently small to allow access to assembly operations from the outside.

We do not know of any integration system for lifting surfaces lateral parts existing in the state of the art like those that have been referred to, in which the conventional in one piece rib mentioned above is replaced with bars forming a truss structure, as is done by the present invention.

DESCRIPTION OF THE INVENTION

In order to achieve the objectives stated above, the invention relates an integration system for lifting surfaces lateral parts in aircrafts, where the lifting surfaces comprise a torsion box capable of bearing aerodynamic and inertial loads.

As a novelty, according to the invention, the torsion box has lateral parts that are connected together with means of attachment, said means of attachment comprise a rib, having an upper part of the central support and a lower part of the central support joined only by angled cross bars, forming a truss structure along the length of the upper part of the central support and the lower part of the central supports.

According to the preferred embodiment of the invention, the angled cross bars comprise longitudinal ends with zones of attachment and a transverse T-shaped section. In the preferred embodiment of the invention, mentioned angled cross bars are attached to the upper and the lower parts of the central supports, alternatively to both sides of a plane of symmetry defined by said upper and lower parts of the central supports.

Moreover, according to the preferred embodiment of the invention, the angled cross bars are attached to the upper and the lower parts of the central supports, dividing the torsion box in the two lateral parts making a zone of access perpendicular to the length of the upper and the lower parts of the central supports, where said zone of access is closed with a piece provided with at least one hole for permanent access. The angled cross bars are made of carbon fiber material, and the upper and lower parts of the central supports are made of titanium.

With the structure that has been described, the invention presents the following main advantages:

The invention solves the problem of accessibility in the final integration of the lateral parts of the torsion boxes maintaining the structural efficiency of the array and simplifying the design, manufacture and assembly of components, with the consequent final saving in economic resources. Furthermore, by means of the invention it is possible to introduce a large number of bars, since the number of attachment points is reduced, increasing the resistance and rigidity of the ensemble, having an upper part of the central support and a lower part of the central support joined only by angled cross bars, forming a truss structure along the length of the upper part of the central support and the lower part of the central support, alternatively to both sides of a plane of symmetry defined by said upper and lower parts of the central supports. Moreover, the design of the invention permits the load between bars to be transmitted directly without any need to load the corresponding metal support or frame, thereby reducing undesirable bending effects concentrated in it. Other advantages of the invention consist of the fact that it is not necessary to make holes for the assembly, and that the number of inspections necessary over the life of the aircraft for corrosion reasons is minimized.

Below, in order to facilitate a better understanding of this descriptive specification and forming an integral part thereof, some figures are attached in which the object of the invention has been represented by way of illustration and non-limiting.

REFERENCES

1=Right lateral part
1'=Left lateral part
2=Right angled cross bars
2'=Left angled cross bars
3=Zones of attachment
4=Zone of access
5=Hole for permanent access
6=Plane of symmetry
7=Lower part of the central support
8=Upper part of the central support

DESCRIPTION OF AN EXAMPLE OF EMBODIMENT OF THE INVENTION

A description is made forthwith of an example of the invention making reference to the numbering adopted in the figures.

Figure 1:
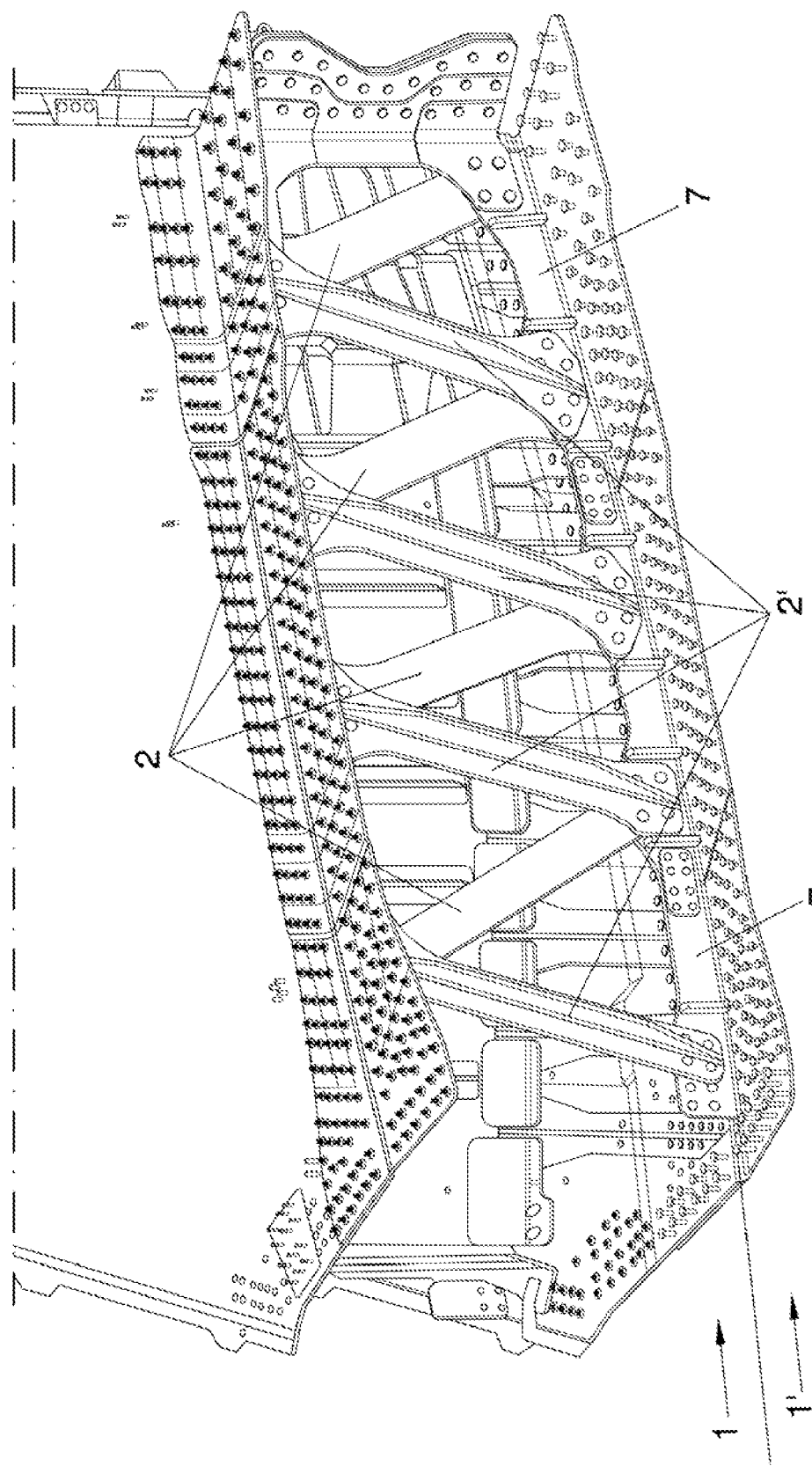
FIG. 1.—Represents a perspective and partial view of some lateral parts of a torsion box connected by angled cross bars forming a truss structure, alternatively to both sides of a plane of symmetry defined by said upper and lower parts of the central supports by means of a system embodied according to the present invention.
Figure 2:
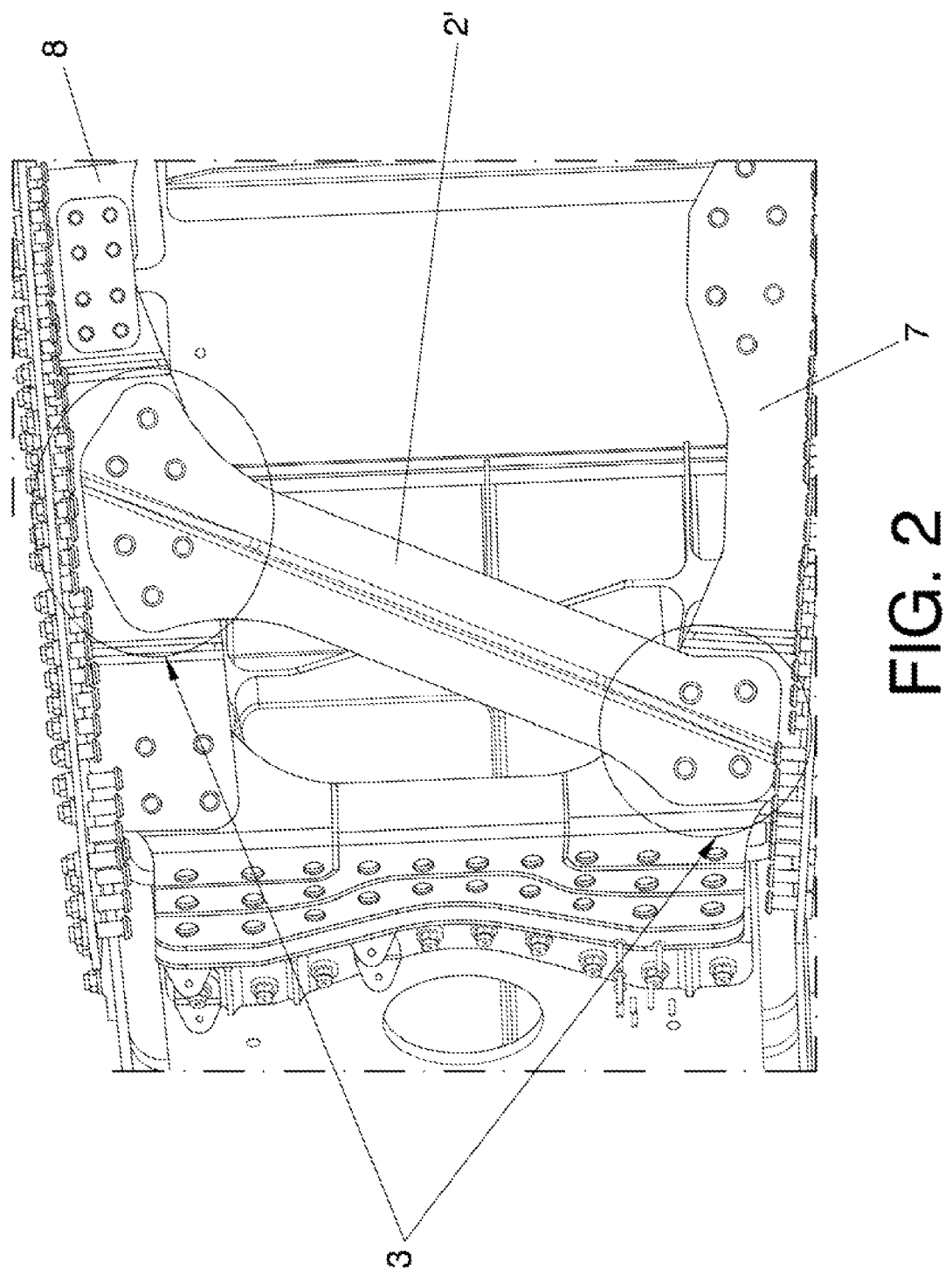
FIG. 2.—Represents a perspective view showing in greater detail one of the angled cross bars referred to in FIG. 1 above, showing zones of attachment of its ends.

So, as is represented in FIG. 1, the integration system for lifting surface lateral parts (1, 1') in aircraft of the present example is applied to a lifting surface which comprises a torsion box and which has a right lateral part (1) and a left lateral part (1') connected together with means of attachment, having an upper part of the central support (8) and a lower part of the central support (7) joined only by angled cross bars (2, 2'), forming a truss structure along the length of the upper part of the central support (8) and a lower part of the central support (7).

As it is also shown in FIG. 1 the angled cross bars (2, 2') are arranged alternatively (or alternatingly) to both sides of a plane of symmetry (6) defined by said upper (8) and lower (7) parts of the central supports, being right angled cross bars (2) placed at the right part (1) of the torsion box and left angled cross bars (2') placed at the left part (1') of the torsion box, with respect to the flight direction.

Figure 3:
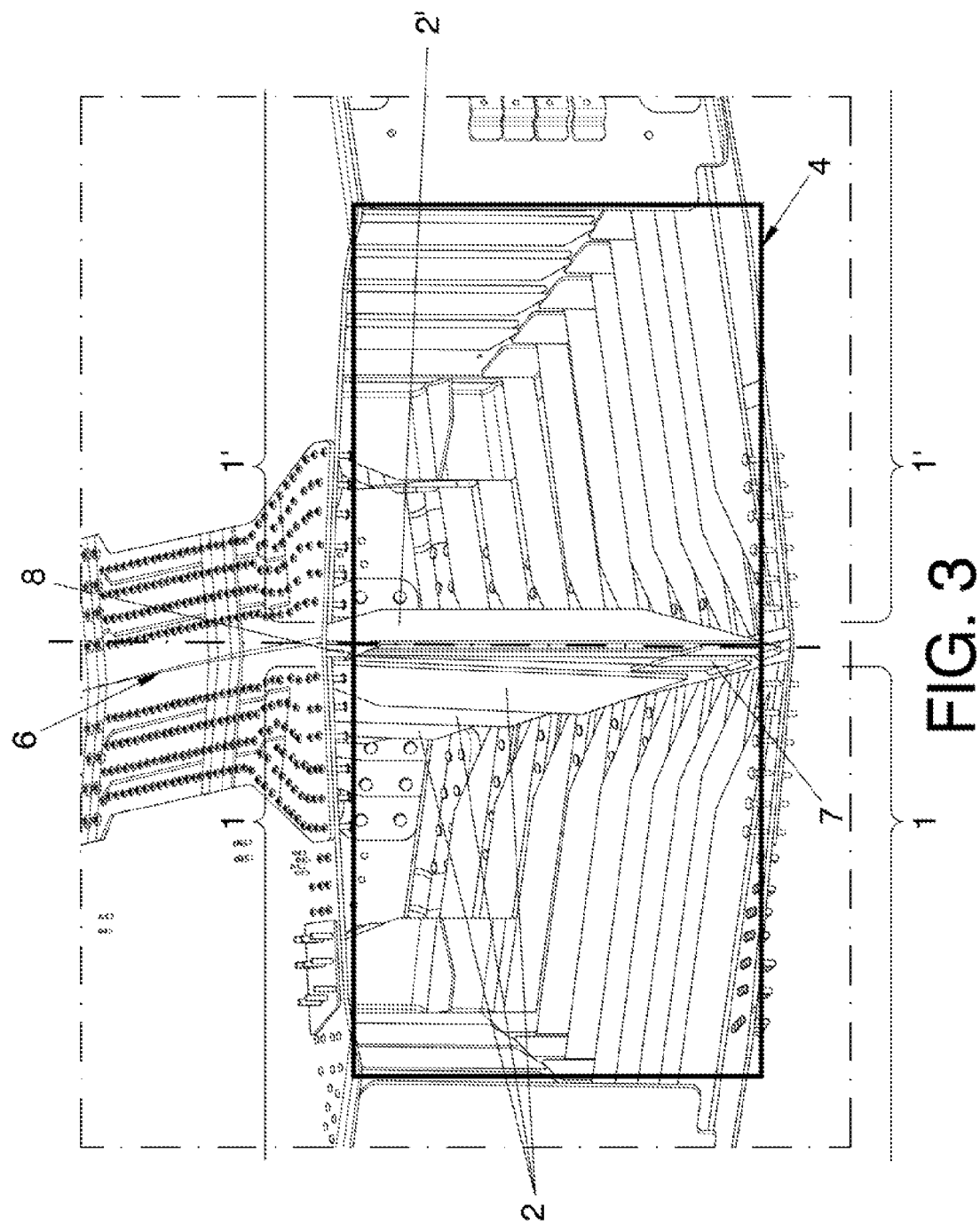
FIG. 3.—Represents a perspective view showing a zone of access in the assembly phase of the corresponding lateral parts in a system like the one of FIG. 1 above.
Figure 4:
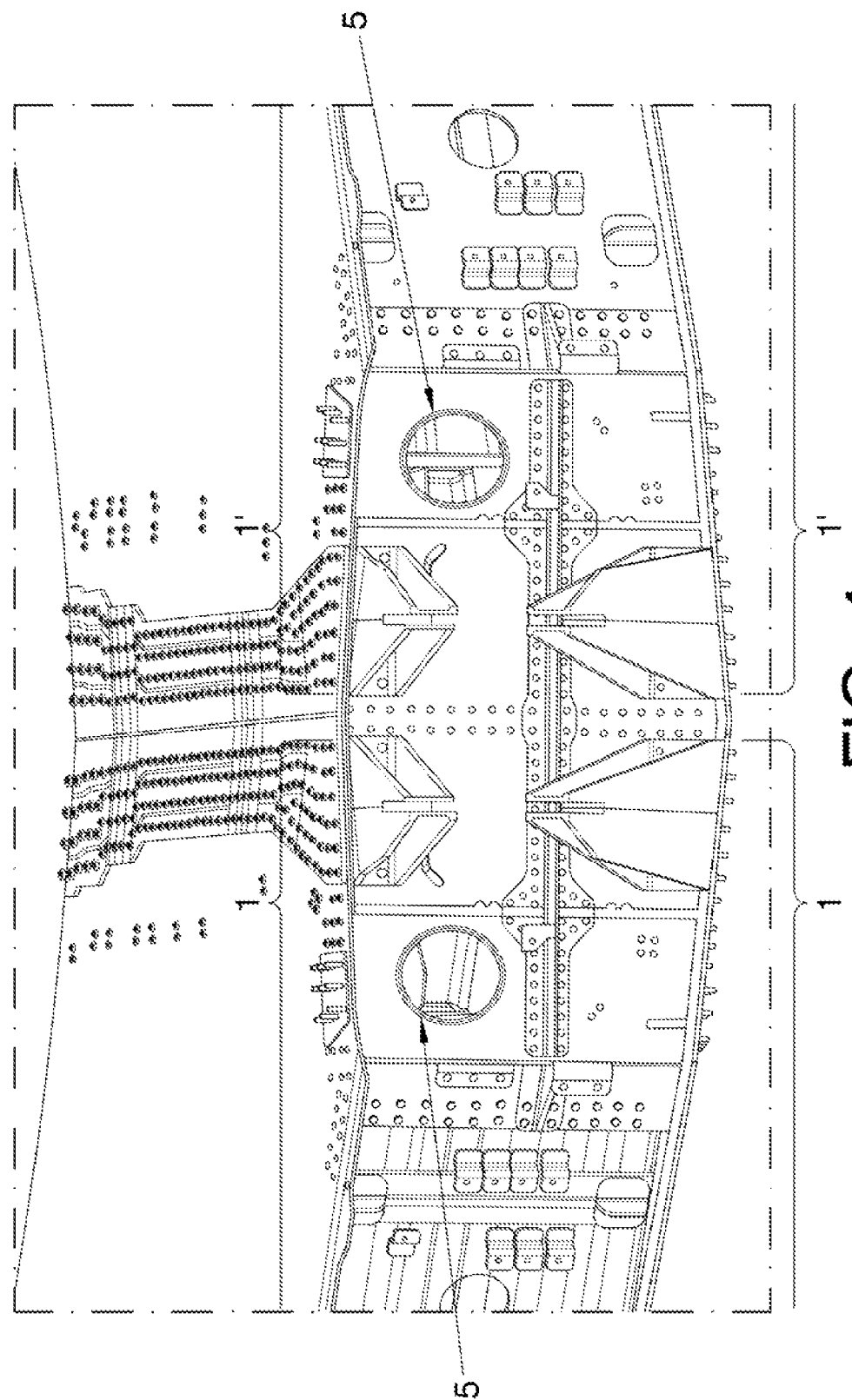
FIG. 4.—Represents a perspective view analogous to the one of FIG. 3 above, once the said zone of access in the assembly phase has been closed with a piece that includes permanent access holes.
Figure 5:
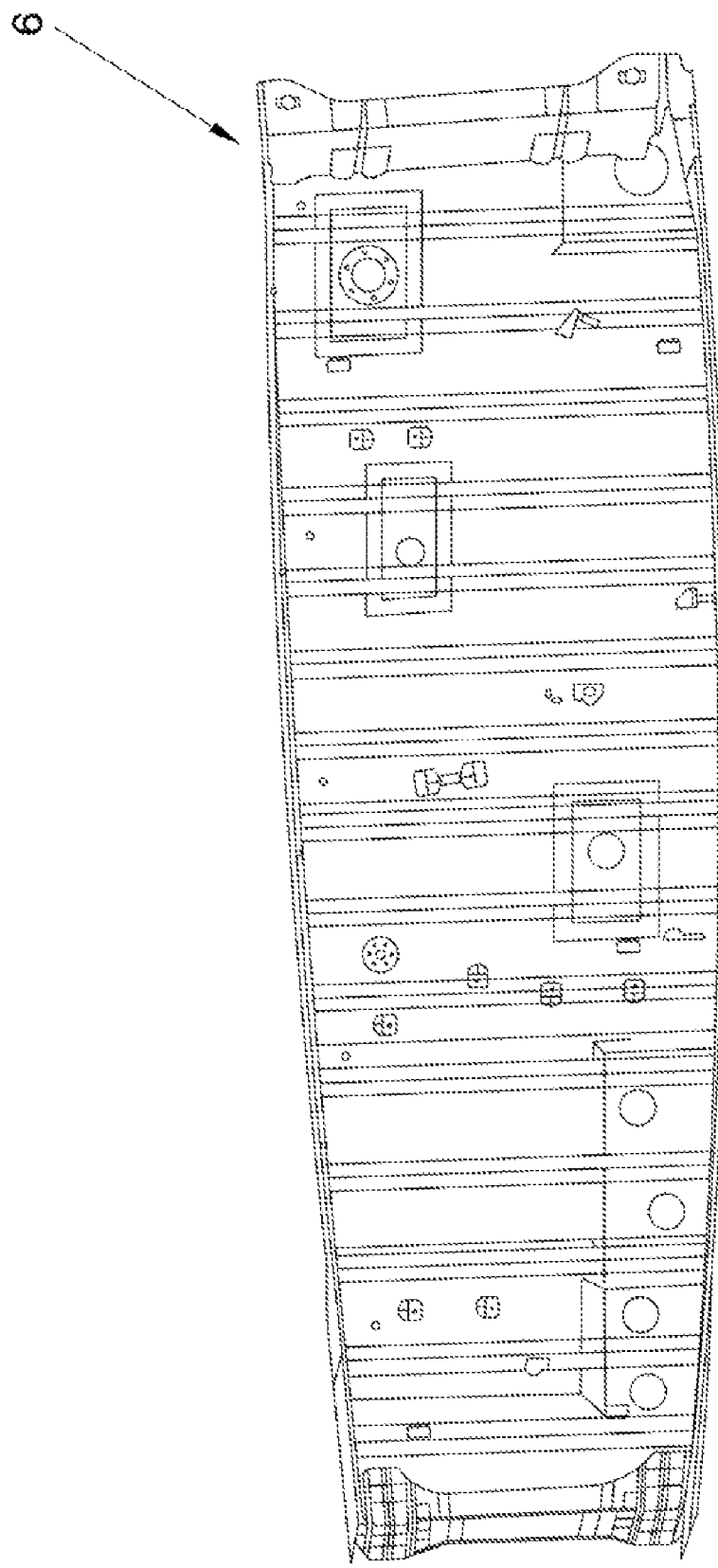
FIGS. 5 and 6.—Are figures belonging to the state of the art, and which represent respective front and rear perspective views of a conventional rib with flat core which is currently used for integration of the lateral parts for lifting surfaces in aircrafts.
Figure 6:
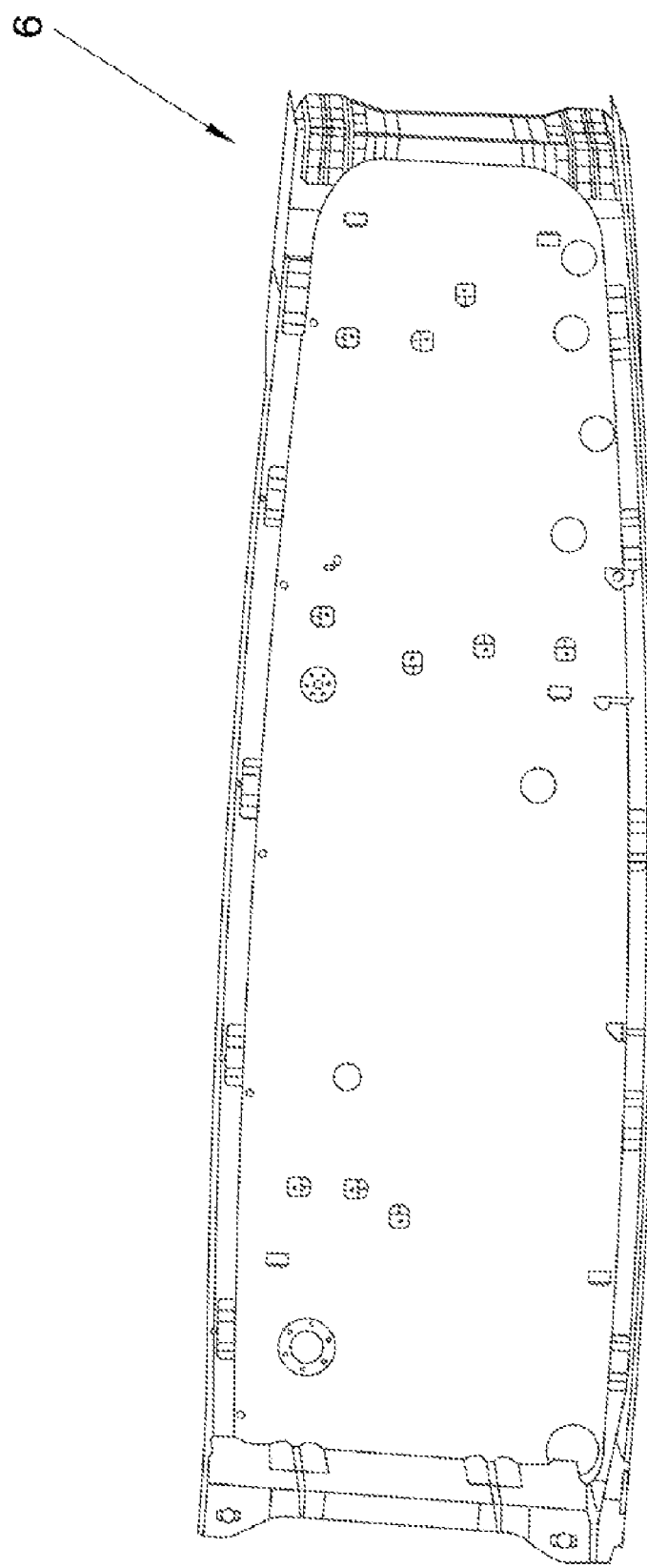

The assembly of lifting surfaces formed by lateral parts (1, 1') of the torsion box requires inspection holes for assembly and maintenance which are minimized by means of said arrangement of bars (2, 2'), forming a truss structure as it has being previously described. So, according to the preferred embodiment, the angled cross bars (2, 2') are attached to the upper (8) and the is lower (7) parts of the central supports, dividing the torsion box in the two lateral parts (1, 1') making a zone of access (4) perpendicular to the length of the upper (8) and the lower (7) parts of the central supports, where said zone of access (4) is closed with a piece provided with at least one hole for permanent access (5), shown in FIG. 3. This zone of access (4) can be temporary, being used solely in the assembly phase, in order to be closed afterwards with a piece provided with holes for permanent access (5), as has been represented in FIG. 4.

On the other hand, according to the present example, in the corresponding assembly the angled cross bars (2, 2') are made of carbon fiber material, and are attached to central supports (7, 8) made of titanium.

In the present example, each one of the bars (2, 2') has longitudinal ends with zones of attachment (3) and a transverse T-shaped section. Additionally, in the present example, the bars (2, 2') are made of materials with high resistance to corrosion. Examples of such materials that are especially resistant to corrosion are carbon fiber and titanium, which are also galvanically compatible with each other.

The invention claimed is:

1. An integration system for lifting surface lateral parts in an aircraft, where the lifting surface lateral parts comprise lateral parts of a torsion box capable of bearing aerodynamic and inertial loads, wherein the lateral parts of the torsion box are connected together with means of attachment, said means of attachment comprising a rib, having a central support upper part and a central support lower part joined by angled cross bars, forming a truss structure along the length of the central support upper part and the central support lower part;

the angled cross bars comprise longitudinal ends with zones of attachment, and each of the angled cross bars has a transverse T-shaped section; and the angled cross bars are attached, to the central support upper part and the central support lower part, alternatingly on opposite sides of a plane of symmetry defined by said central support upper and lower parts.

2. The system of claim 1, wherein the angled cross bars are attached to the central support upper and lower parts, defining the lateral parts of the torsion box and a zone of access perpendicular to the length of the central support upper and lower parts, where said zone of access is closed with a piece provided with at least one hole for permanent access at a front end of the torsion box.

3. The system of claim 1, wherein the angled cross bars are made of carbon fiber material, and the central support upper and lower parts are made of titanium.

4. An integration system for lifting surface lateral parts in an aircraft, where the lifting surface lateral parts comprise lateral parts of a torsion box capable of bearing aerodynamic and inertial loads, wherein the lateral parts of the torsion box are connected together with means of attachment, said means of attachment comprising a rib, having a central support upper part and a central support lower part joined by angled cross bars, forming a truss structure along the length of the central support upper part and the central support lower part;

the angled cross bars extend between the central support upper part and the central support lower part and are angled relative to a vertical, each of said angled cross bars being attached to both the central support upper part and the central support lower part; and the angled cross bars are alternatingly disposed on opposite sides of a vertical plane of symmetry defined by the central support upper and lower parts.

5. The system of claim 4, wherein the angled cross bars are respectively alternatingly angled by being tilted forwardly and rearwardly relative to a vertical.

6. An integration system for lifting surface lateral parts in an aircraft, where the lifting surface lateral parts comprise lateral parts of a torsion box capable of bearing aerodynamic and inertial loads, wherein the lateral parts of the torsion box are connected together with means of attachment, said means of attachment comprising a rib, having a central support upper part and a central support lower part joined only by angled cross bars, forming a truss structure along the length of the central support upper part and the central support lower part;

the angled cross bars extend between the central support upper part and the central support lower part and are angled relative to a vertical, each of said angled cross bars being attached to both the central support upper part and the central support lower part; and the angled cross bars are respectively alternatingly angled by being tilted forwardly and rearwardly relative to a vertical.

* * * * *